(12) United States Patent
Stalo

(10) Patent No.: US 6,266,530 B1
(45) Date of Patent: Jul. 24, 2001

(54) MULTI-CELL COMMUNICATION SYSTEM AND METHOD FOR ALLOCATING A COMMUNICATION RESOURCE THEREIN

(75) Inventor: William J. Stalo, Harvard, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/087,167

(22) Filed: May 29, 1998

(51) Int. Cl.$^7$ .................................................... H04Q 7/20
(52) U.S. Cl. ........................... 455/436; 455/422; 455/403
(58) Field of Search ............................... 455/62, 63, 67.1, 455/67.6, 433, 436, 438, 439, 422, 440, 442, 443, 450, 507, 448, 510, 524, 446, 447; 379/22, 27, 58–60, 63; 340/825.5, 827

(56) References Cited

U.S. PATENT DOCUMENTS

| | | | |
|---|---|---|---|
| 5,371,780 | * 12/1994 | Amitay | 379/58 |
| 5,455,821 | * 10/1995 | Schaeffer et al. | 370/17 |
| 5,603,085 | * 2/1997 | Shedlo | 455/33.1 |
| 5,682,601 | * 10/1997 | Sasuta | 455/33.2 |
| 5,862,485 | * 1/1999 | Linneweh, Jr. et al. | 455/450 |
| 5,867,785 | * 2/1999 | Averbuch et al. | 455/436 |
| 5,878,026 | * 3/1999 | Greenberg et al. | 370/230 |
| 6,055,427 | * 4/2000 | Ojaniemi | 455/436 |

* cited by examiner

Primary Examiner—Daniel Hunter
Assistant Examiner—C. Chow
(74) Attorney, Agent, or Firm—Jeffrey K. Jacobs

(57) ABSTRACT

A multi-cell communication system (100) that includes a plurality of communication units (105, 106), a plurality of base radios (108–112), and at least one system controller (128) employs a method (200) and apparatus for allocating a communication resource to a communication unit within a zone (101). In establishing a communication (118) for a communication unit (105) via a base radio (110), a communication resource (124) is allocated to the communication unit (105). This allocation of the communication resource (124) is maintained for the communication unit (105) for as long as the communication unit (105) is engaged in the communication (118) within the zone (101). When the communication unit (105) hands-off to another base radio (108) within the zone (101), deallocation of the communication resource (124) from the communication unit (105) is prevented during and after the hand-off to improve system capacity while minimizing hand-off muting.

11 Claims, 2 Drawing Sheets

MULTI-CELL COMMUNICATION SYSTEM AND METHOD FOR ALLOCATING A COMMUNICATION RESOURCE THEREIN

FIELD OF THE INVENTION

The present invention relates generally to multi-cell communication systems and, in particular, to a method and apparatus for allocating a communication resource to a communication unit within a zone in a multi-cell communication system.

BACKGROUND OF THE INVENTION

Multi-cell communication systems are well known. They are typically comprised of a plurality of stationary cell sites and a plurality of mobile subscriber units. The cell sites, distributed across a geographic region, contain base radios which are all linked to switching and control devices. A particular cell site provides communication to the subscriber units within its service coverage area, or cell. By interconnecting and distributing cell sites in an adjacent fashion, a much broader, combined coverage area can be created. Subscriber units anywhere in this combined area, then, are able to obtain communication, both inside and outside the communication system, via at least one of the cell sites and, thereby, via the system switching and control devices. As subscriber units travel from the coverage area of one cell site to another an ongoing communication must be handed-off to be maintained. A number of techniques exist and are well known for performing such hand-offs. Mobile-assisted hand-off (MAHO) is one such technique.

In general, when a communication is established in a multi-cell communication system, the system devices must allocate communication resources to support the communication. In such systems, there are only a limited number of communication channels available between a cell site and its controller. One communication channel from this pool, if available, is allocated to establish the communication. Now, if the subscriber unit involved in the communication must hand-off, the original communication channel is also handed-off to a second communication channel. This is necessary because, today, such communication channels are dedicated or assigned to particular cell site base radios on a permanent basis, and handing-off involves switching from one base radio to another. So to hand-off, the second communication channel must be allocated just as the original channel was. If a second channel is not available, the hand-off can not be performed and the communication may be dropped as a result. When communication is dropped because hand-offs can not be performed, the effective system coverage suffers. Also, if a second channel is available and is allocated, the system now has two communication channels in use for one communication until the hand-off is completed. In a busy system this may prevent another communication from being established, thus, reducing the system capacity. And finally, handing-off to the second communication channel may require a temporary muting of the communication until the hand-off is completed.

A need exists, therefore, for an apparatus and method for allocating communication resources in such a manner as to limit the problems of reduced system coverage, reduced system capacity, and muting during hand-offs.

DESCRIPTION OF A PREFERRED EMBODIMENT

Generally, the present invention encompasses a method and apparatus for allocating a communication resource to a communication unit within a zone of a multi-cell communication system, wherein this communication system includes a plurality of communication units, a plurality of base radios, and at least one system controller. In establishing a communication for a communication unit in a zone via a first base radio of the plurality of base radios, a communication resource is allocated to the communication unit for as long as the communication is maintained within the particular zone of the communication system. When the communication unit hands-off from the first base radio to a second base radio, and the communication unit will remain within the zone throughout the hand-off, the allocation of the communication resource will not change. The communication resource will remain allocated to the communication unit during the hand-off and after, when the communication is maintained via the second base radio. By not allocating a new communication resource and switching from the original communication resource to the new communication resource as is done today, the problems encountered today due to this switching during hand-offs, reduced system coverage, reduced system capacity, and muting, are eliminated while the communication unit remains within a particular zone of the system.

Figure 1:
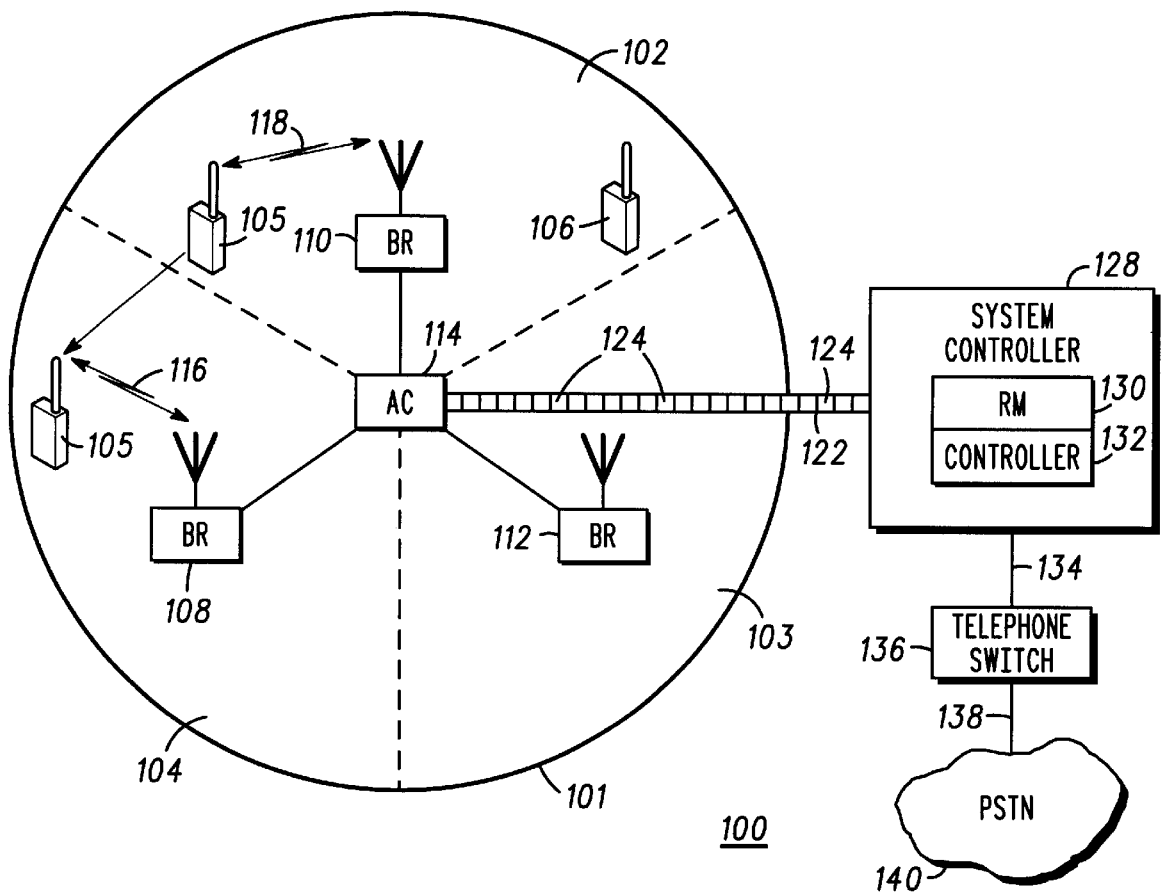
FIG. 1 illustrates a block diagram depiction of a multi-cell communication system in accordance with a preferred embodiment of the present invention.
Figure 2:
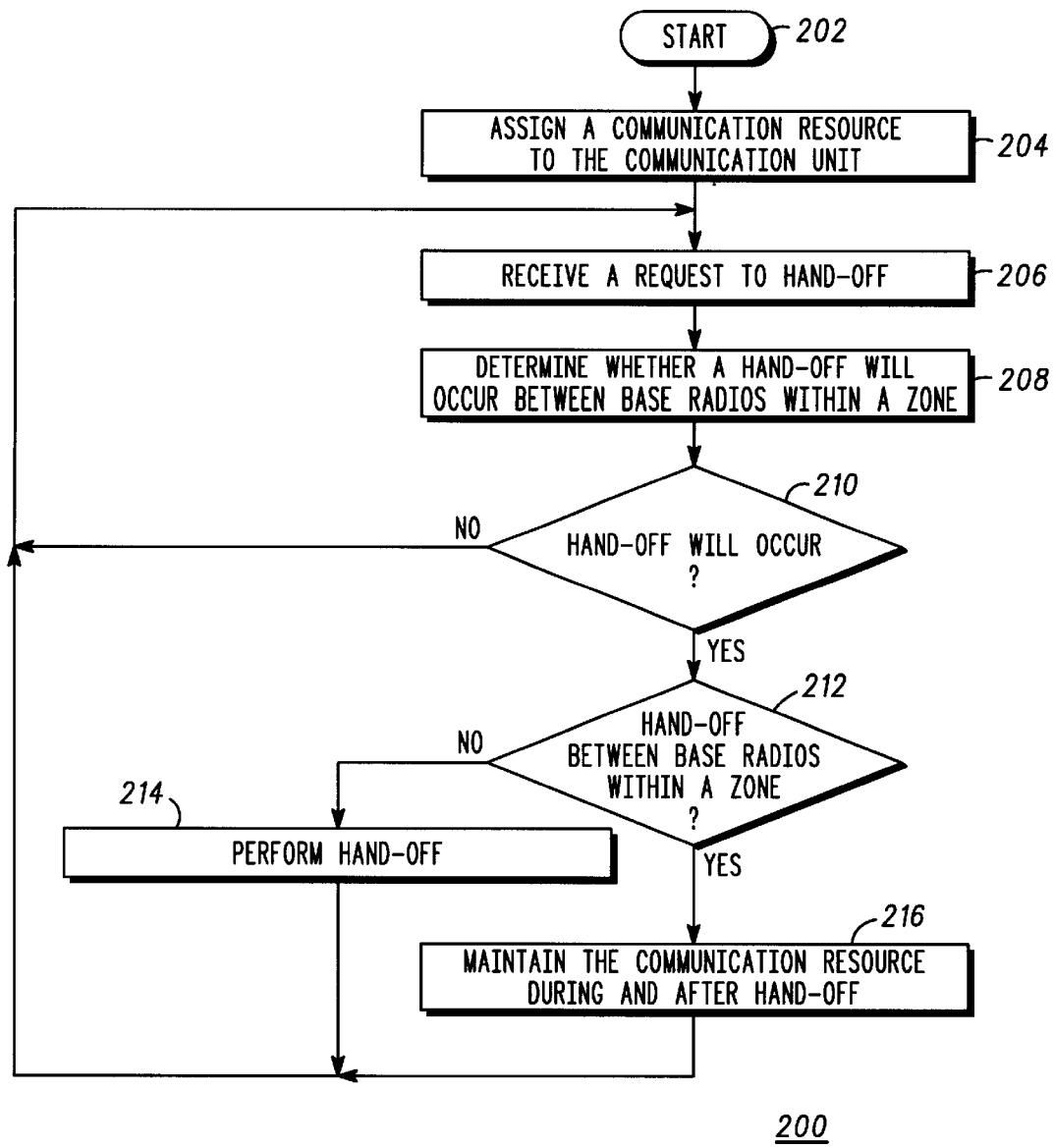
FIG. 2 illustrates a logic flow diagram of steps executed by a multi-cell communication system to allocate a communication resource to a communication unit in accordance with a preferred embodiment of the present invention.

The present invention can be more fully understood with reference to FIGS. 1 and 2. FIG. 1 illustrates a multi-cell communication system 100 in accordance with a preferred embodiment of the present invention. The multi-cell communication system 100 comprises a plurality of communication units 105–106, a plurality of base radios 108–112, an access controller 114 coupled via a communication link 122 to a system controller 128, and a telephone switch 136. Preferably, the multi-cell communication system 100 comprises an "iDEN" communication system that is commercially available from Motorola, Inc. of Schaumburg, Ill. Accordingly, the communication units 105–106 are preferably "iDEN" phones. The plurality of base radios 108–112, the access controller 114, the system controller 128, the telephone switch 136, and the communication links 122, 134, and 138 preferably comprise "iDEN" infrastructure components. The telephone switch 136 is coupled via communication link 138 to the public switched telephone network (PSTN), and the system controller 128 is coupled via communication link 134 to the telephone switch 136. The system controller 128, in a preferred embodiment, comprises a base site controller, specifically an "iDEN" base site controller. The system controller 128 further comprises a controller 132 and a resource manager (RM) 130, which are both preferably implemented in software routines executed by base site controller hardware components.

Operation of the multi-cell communication system 100 occurs, in accordance with the present invention, substantially as follows. Communication units 105 and 106 are located in the service coverage area, or sector, 102 of base radio 110. System controller 128 controls the operation of the communication units 105 and 106 within zone 101. In a preferred embodiment, the system controller 128, or more specifically the controller 132, controls the operation of the communication units 105 and 106 within its zone 101 to the extent that infrastructure services are involved. A communication unit can operate individually without a system controller, for example, but it can not operate as an active part of the communication system without being controlled by the system controller.

The base radios 108–112 are coupled to the system controller 128 to provide the plurality of communication units 105 and 106 with communication inside and outside the communication system. Communication 118, for the sake of this description, is a communication between the user of the communication unit 105 and a user of the PSTN 140 outside the multi-cell communication system 100. A communication path must, therefore, exist between communication unit 105 and the PSTN 140 to support the communication 118. The access controller 114 is coupled between the plurality of base radios and the system controller and controls the communication between the plurality of base radios and the system controller. Communication link 122 carries the communication between the plurality of base radios 108–112 and the system controller 128. The access controller 114 controls the communication between the plurality of base radios 108–112 and the system controller 128 by distributing each communication from the system controller 128 to the appropriate destination base radio and directing each of the communications destined for the system controller 128 from the plurality of base radios 108–112 on to the system controller 128. Since the system controller 128, then, is coupled to the PSTN 140 via the telephone switch 136 a communication path from the communication unit 105 to the PSTN 140 exists.

Communication 118 is established between communication unit 105 and the PSTN 140 by known call setup methods. In establishing communication 118, the system controller 128, or more specifically the resource manager 130, allocated a communication resource for the communication between the system controller 128 and the base radio 110. In a preferred embodiment, communication link 122 comprises a number of infrastructure communication resources wherein each infrastructure communication resource comprises a communication time slot on a time division multiple access carrier. In an alternate embodiment, each infrastructure communication resource could instead comprises a communication channel. To establish communication 118, the resource manager 130 allocated communication resource 124 to communication unit 105. The resource manager 130 will allocate and maintain the communication resource 124 for communication unit 105 for as long as the communication unit is within zone 101 and involved in communication 118. Zone 101 is the combined coverage area of a multi-sectored cell, i.e. sectors 102–104. In an alternate embodiment, such a zone could be the combined coverage area of a cell site. While involved in communication 118 the communication unit 105 may leave sector 102 and enter sector 104 (as denoted in FIG. 1 by the arrow). Maintaining communication 118 even when unit 105 leaves the coverage area of base radio 110 requires a handoff from base radio 110 to base radio 108, shown by communication 116. Because the communication unit is remaining within zone 101 throughout the hand-off, the resource manager 130 will maintain the communication resource 124 for the communication unit 105 during the hand-off and for as long as the communication unit 105 is within the zone 101 and involved in communication 116. It is noted, that communication 118 is labeled as communication 116 in FIG. 1 after handing-off to base radio 108 only to denote the change in base radios. So the resource manager 130 allocates a communication resource 124 to a communication unit 105 when establishing communication 118 and prevents the reallocation of the communication resource 124 for as long as the communication unit 105 is within the zone 101, is involved in communication 118, and hands-off within the zone 101.

FIG. 2 illustrates a logic flow diagram 200 of steps executed by a multi-cell communication system to allocate a communication resource to a communication unit in accordance with a preferred embodiment of the present invention. The logic flow begins (202) when a system controller assigns (204) a communication resource to a communication unit to support a communication. As the communication unit, engaged in the communication via a base radio, moves within a zone but toward the edge of the base radio's coverage area, a request to hand-off is received (206). In the preferred embodiment, this request to hand-off is made by the communication unit and received by the system controller via the base radio, in accordance with known mobile-assisted hand-off techniques. Alternately, however, other hand-off techniques could be used, and in which case, the communication unit may receive the request to hand-off. The next step is determining (208) whether the hand-off will occur between base radios within the zone, in other words, whether the hand-off will occur, and if occurring, whether it is between base radios within the zone. If (210) it is determined that a hand-off will not occur at this time, a return to the step of receiving (206) is made. If (212) it is determined that a hand-off will occur but not between base radios within the zone, the hand-off is performed (214) and the step of receiving (206) is returned to. Otherwise if (212) it is determined that a hand-off will occur between base radios within the zone, the communication resource is maintained (216) for the communication unit and the deassignment of the communication resource from the communication unit prevented during the hand-off. The communication resource, then, is maintained (216) for the communication unit and the deassignment of the communication resource from the communication unit is prevented after the hand-off has been completed and for as long as the communication is maintained within the zone. As in the previous cases, the step of receiving (206) hand-off requests is returned to upon handing-off.

Today a communication resource is riot maintained during a hand-off within such a zone. Instead, a new communication resource must be allocated and a hand-off from one communication resource to the other performed. This second allocation introduces problems. If a communication resource is not available the communication unit will not be able to hand-off and its communication may be dropped as a result. If a communication resource is available, it is then allocated, bringing to two the number of communication resources in use for one communication during the hand-off. This temporarily reduces the system capacity since new communication may be denied due to communication resource unavailability. Also, the switching between communication resources may lead to the temporary muting of the communication. So in accordance with the present invention when handing-off between base radios within a zone, a communication resource is maintained for as long as a communication is maintained including during a hand-off and after the hand-off has been completed. This is done in order to improve system capacity and minimize muting due to the hand-off.

While the present invention has been particularly shown and described with reference to particular embodiments thereof, it will be understood by those skilled in the art that various changes in form and details may be made therein without departing from the spirit and scope of the present invention.

I claim:

1. A communication system, comprising:

a plurality of communication units;

a system controller for controlling operation of the plurality of communication units within a zone, the system controller comprising:

a resource manager to allocate and maintain a communication resource for a communication unit of the plurality of communication units for as long as the communication unit is within the zone, involved in communication, and hands-off within the zone, wherein the communication resource comprises an infrastructure communication resource between infrastructure components of the communication system; and a plurality of base radios coupled to the system controller to provide the plurality of communication units with communication inside and outside the communication system.

2. The communication system of claim 1, further including at least one access controller coupled between the plurality of base radios and the system controller for controlling the communication between the plurality of base radios and the system controller.

3. The communication system of claim 1, wherein the system controller comprises a base site controller.

4. The communication system of claim 1, wherein the zone comprises a combined coverage area of a multi-sectored cell.

5. The communication system of claim 1, wherein the zone comprises a combined coverage area of a cell site.

6. The communication system of claim 1, wherein the infrastructure communication resource comprises a communication channel.

7. The communication system of claim 1, wherein the infrastructure communication resource comprises a communication time slot on a time division multiple access carrier.

8. A system controller operating within a communication system having a plurality of communication units and a plurality of base radios, the system controller comprising:

a controller for controlling operation of the plurality of communication units within a zone; and a resource manager to allocate a communication resource to a communication unit of the plurality of communication units when establishing communication and to prevent reallocation of the communication resource for as long as the communication unit is within the zone, is involved in communication, and hands-off within the zone, wherein the communication resource comprises an infrastructure communication resource between infrastructure components of the communication system.

9. A method of allocating a communication resource to a communication unit comprising:

assigning a communication resource to the communication unit to support a communication;

receiving a request to hand-off; determining whether a hand-off will occur between base radios within a zone; and when handing-off between base radios within the zone, maintaining the communication resource as long as the communication is maintained including during the hand-off and after the hand-off has been completed in order to improve system capacity and minimize muting due to the hand-off, wherein the communication resource comprises an infrastructure communication resource between infrastructure components of the communication system.

10. The method of claim 9, wherein the step of determining includes determining whether a hand-off will occur.

11. The method of claim 9, wherein the step of maintaining includes preventing the deassignment of the communication resource from the communication unit as long as the communication is maintained including during the hand-off and after the hand-off has been completed.

* * * * *